W. E. BIGGERSTAFF.
SEED PLANTER.
APPLICATION FILED OCT. 25, 1912.
1,063,907.
Patented June 3, 1913.
3 SHEETS—SHEET 1.
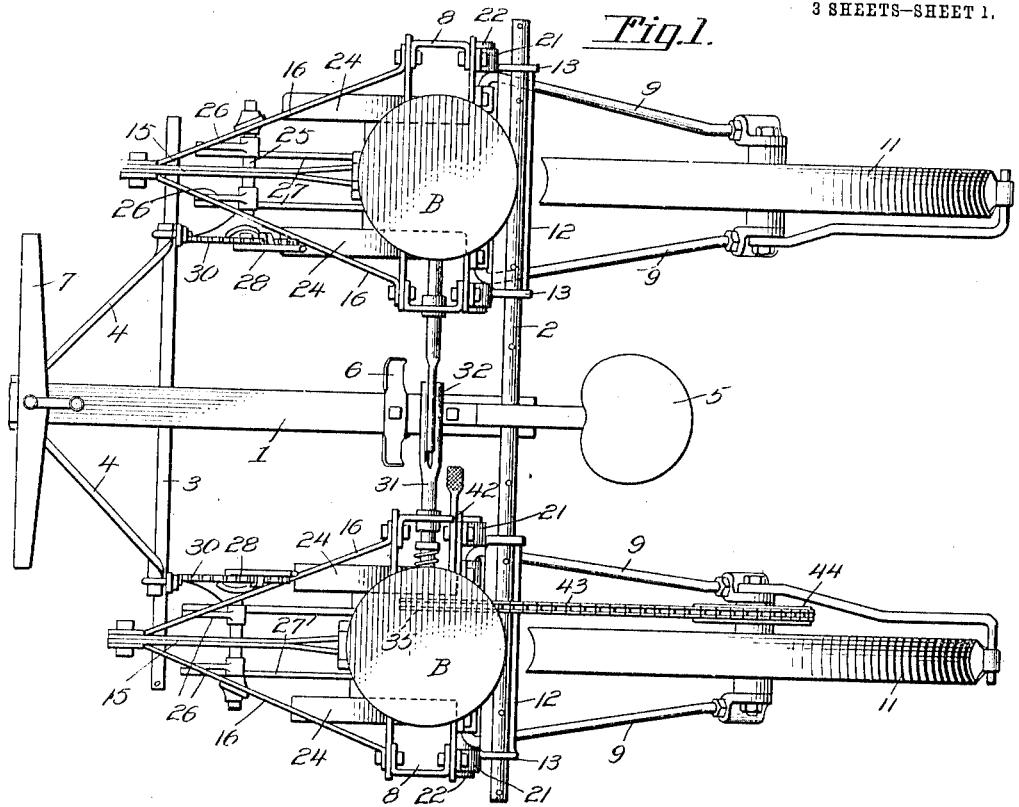
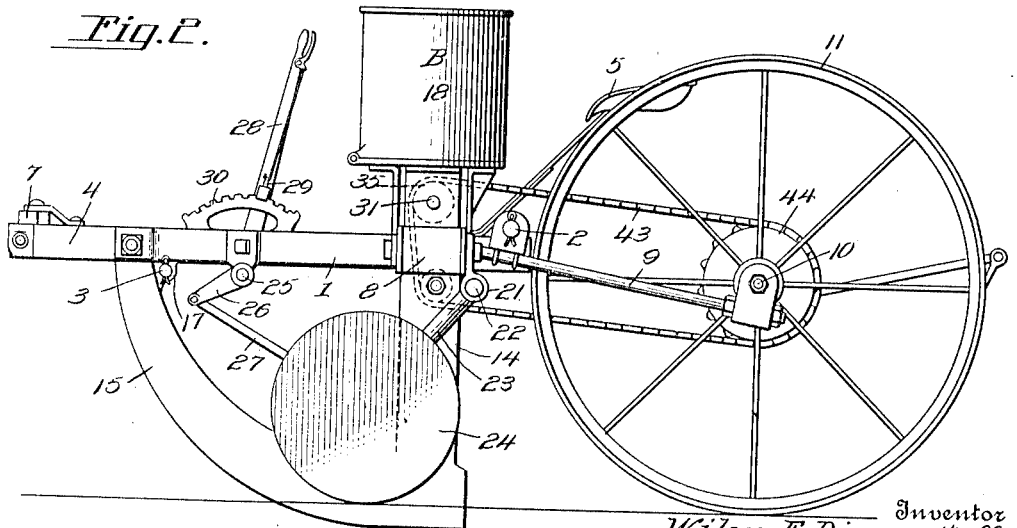
Witnesses
F. C. Gibson.
Inventor
Wilson E. Biggerstaff.
By Victor J. Evans
Attorney

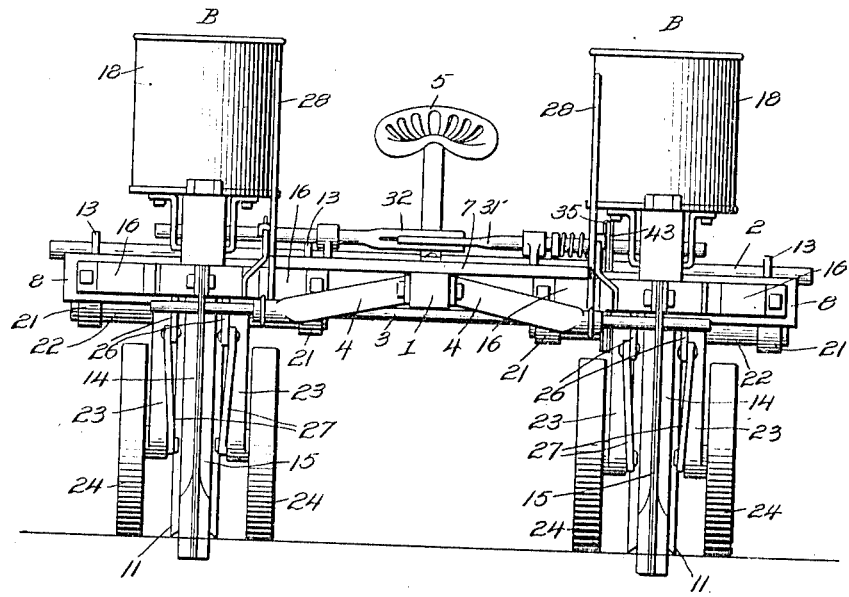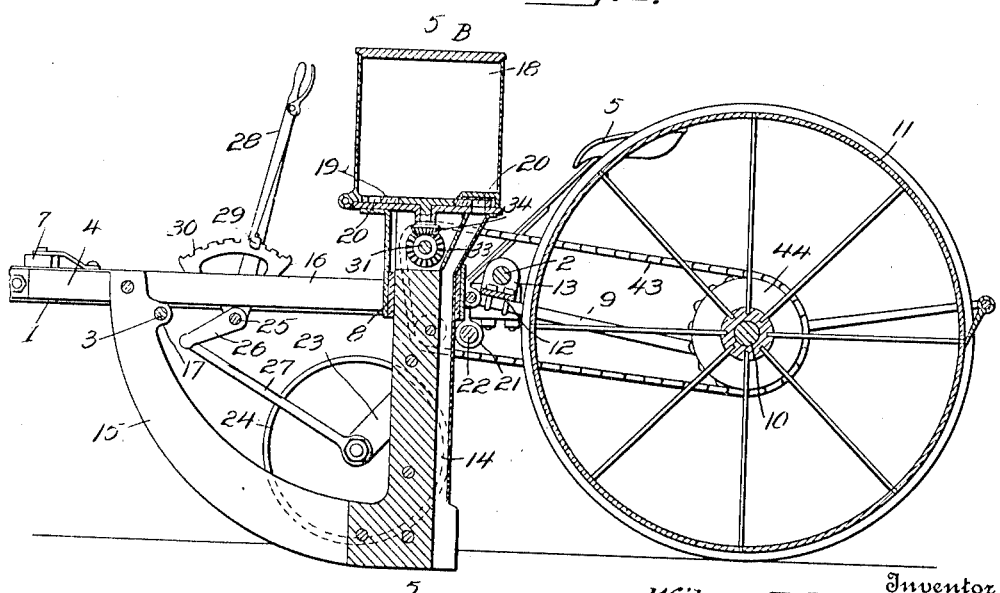

W. E. BIGGERSTAFF.
SEED PLANTER.
APPLICATION FILED OCT. 25, 1912.

1,063,907.

Patented June 3, 1913.

3 SHEETS—SHEET 3.

Inventor
Wilson E. Biggerstaff.

Witnesses

By Victor J. Evans
Attorney

UNITED STATES PATENT OFFICE.

WILSON E. BIGGERSTAFF, OF MALVERN, IOWA.

SEED-PLANTER.

1,063,907.                Specification of Letters Patent.      Patented June 3, 1913.

Application filed October 25, 1912. Serial No. 727,772.

*To all whom it may concern:*

Be it known that I, WILSON E. BIGGERSTAFF, a citizen of the United States, residing at Malvern, in the county of Mills and State of Iowa, have invented new and useful Improvements in Seed-Planters, of which the following is a specification.

This invention relates to seed planters, and it has particular reference to a machine for drilling seed, particularly corn in listed furrows.

One object of the invention is to produce a machine the seed dropping elements of which will be automatically guided so as to drop the seed accurately in the bottom of the previously prepared furrows, and whereby the seed will be evenly covered and compactly packed in such a manner as to insure the best possible conditions for vigorous growth.

A further object of the invention is to produce a seed planter of the class described, wherein a plurality of seed planting elements will be movably supported with respect to one another, said seed planting elements being automatically adjusted to the proper position for depositing seed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 5:
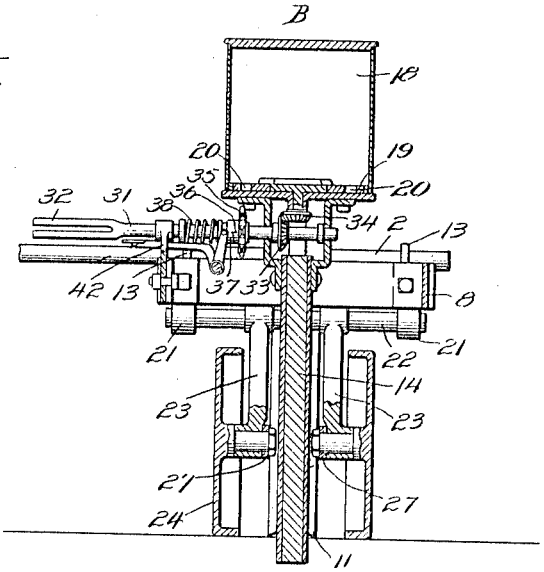
Figure 6:
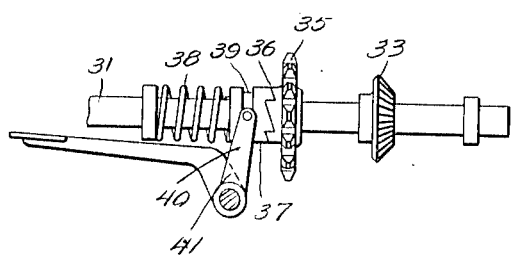

In the drawings,—Figure 1 is a top plan view of a seed planter constructed in accordance with the invention. Fig. 2 is a side elevation of the same. Fig. 3 is a front elevation. Fig. 4 is a longitudinal vertical sectional view taken through one of the seed planting elements. Fig. 5 is a vertical transverse sectional view taken on the line 5—5 in Fig. 4. Fig. 6 is a detail view of the operating shaft and related parts.

Corresponding parts in the several figures are denoted by like characters of reference.

The frame structure of the improved planter comprises mainly a center bar 1, a rear cross bar 2 which is directly connected with the center bar and a front cross bar 3 which is supported by means of braces 4, the front ends of which are connected with the center bar, and the rear ends of which are directly connected with the cross bar 3. The center bar supports the driver's seat 5 and a foot bar or rest 6. Said center bar also supports an evener 7 to which the draft may be applied.

The machine usually embodies in its construction two seed planting elements B, each including a rectangular frame 8. Hingedly connected with the frame 8 of each seed planting element is a rearwardly extending yoke 9, the limbs of which afford bearings for a shaft or axle 10 carrying a covering wheel 11, the same having a broad, preferably concaved frame or tread, whereby the dirt will be packed upon the seed. Secured on the yoke 9 in advance of the covering wheel is a cross bar 12 having upwardly extending apertured lugs 13 engaging the rear cross bar 2 of the frame. It will be seen that the cross bar 12, together with the lugs 13, constitute a bracket whereby the seed planting element is hingedly and slidably connected with the cross bar 2 of the frame.

The rectangular frame 8 of each seed planting element supports a downwardly extending seed tube or duct 14, from the lower end of which the shoe or runner 15 extends forwardly and upwardly. The frame 8 is also provided with forwardly extending converging arms 16, the forward ends of which are connected with the nose of the runner which is thereby firmly supported. At the junction of the arms 14 with the nose of the runner is an apertured lug or plate 17 engaging the front cross bar 3 of the frame and slidable thereon. The rectangular frame also supports a hopper 18 which contains seed dropping mechanism including a disk 19 which is supported for rotation about the axis of the hopper and is provided with seed cups 20, whereby seed is conveyed to and deposited in the upper end of the seed tube or duct 14. The rectangular frame 8 of each seed planting element is provided with bearings 21 supporting a shaft 22 having downwardly extending arms 23, each carrying a gage wheel 24. The converging arms 16 extending forwardly from the frame 8 support a rock shaft 25 having arms or cranks 26 which are connected by links 27 with the wheel carrying arms 23. The rock shaft 25 also has an operating lever 28 provided with a stop member 29 adapted to engage the teeth of a rack segment 30 supported on one of the arms 23. It will be seen that by manipulating the lever 28, the wheel carrying arms 23 may be actuated so as to raise or lower the gage wheels with respect to the runners. The frame 8 of each seed planting element is provided with bearings for an operating shaft 31 which extends from the hopper in the direction of the medial line of the machine. The operating shafts 31 are provided at their inner ends with interengaging forks 32, whereby said shafts are slidably connected, but in such a manner that when one of said shafts is rotated about its axis, such rotary movement will be transmitted to the other shaft. By this simple construction, when the seed planting elements are mounted slidably on the cross bars 3 and 2 of the frame, and the operating shafts are placed with their forks in interengaging relation, it will be seen that when one of said operating shafts is rotated, the rotary motion will be transmitted to the other operating shaft, irrespective of the relative positions of the seed planting elements with respect to one another. Motion is transmitted from each operating shaft to the seed disk 19 in the hopper with which such operating shaft is associated in any suitable well known manner; for instance, by a bevel pinion 33 on the operating shaft meshing with bevel teeth 34 on the seed disk.

One of the operating shafts 31 is provided with a sprocket pinion 35 which is mounted thereon for rotation; said sprocket pinion having a clutch member 36 which is adapted to be engaged by a slidable clutch member 37 which is keyed on the shaft for rotation therewith, said clutch member 37 being automatically moved in the direction of the clutch member 36 by means of a spring 38. The slidable clutch member has an annular groove 39 engaged by a fork 40 on one arm of a bell crank 41, the other arm of which constitutes a handle which is adapted to be engaged by a suitable clutch 42, whereby said bell crank may be retained in adjusted position to hold the slidable clutch member 37 in or out of engagement with the clutch member 36. The sprocket pinion 35 associated with the clutch member 36 is connected by a chain or link bolt 43 with a sprocket wheel 44 associated for rotation with the covering wheel 11, it being understood that several sprocket wheels 44 of different diameters may be provided in order that the speed of rotation of the operating shaft may be varied.

From the foregoing description, taken in connection with the drawings hereto annexed, the operation and advantages of this invention will be readily understood by those skilled in the art to which it appertains. The planter, as stated, is particularly intended and adapted for planting listed ground. The gage wheels associated with each seed planting element will travel on the inclined side walls of the furrows, while the runners operate directly in the bottom of the furrows. Should one of the furrows be crooked, the relative position thereto of the seed planting element will still be maintained, and such element will slide laterally of the frame on the supporting bars 2 and 3. The result will be that the seed will be planted at even depth. No scrapers are employed to scrape the dirt over the seed for the purpose of covering the same, and weed seeds will, therefore, not be thrown in the direction of the seed to germinate in the immediate neighborhood thereof, thereby stunting and obstructing the growth of the crop. The dirt will be firmly packed about the seed by the covering wheels which follow in rear of the runners and seed dropping devices. Vertical adjustment of the gage wheels with respect to the runners may be readily effected for the purpose of placing the parts in the most advantageous position with respect to one another, and when the machine is transported from one place to another, the gage wheels may be utilized for the purpose of supporting the runners. Many other advantages of the improved machine will readily suggest themselves to those experienced in the art. It may, however, be observed that one of the seed planting elements, preferably the one which is equipped with mechanism for transmitting motion to the operating shaft from the covering wheel may be readily detached from the frame and used independently as a one-horse drill or planter. It is also desired to state that with respect to the construction of the drill or seed dropping mechanism, no limitation is intended, as any suitable and well known mechanism may be employed within the scope of the present invention.

Having thus described the invention, what is claimed as new, is:—

1. In a machine of the class described, a supporting frame including a cross bar, a seed planting element including a frame and a ground wheel carrying yoke hingedly connected therewith, a bracket member on said yoke slidably engaging the cross bar, arms supported movably with respect to the frame of the seed planting element, gage wheels carried by said arms, and means for adjusting said arms to regulate the position of the gage wheels.

2. In a machine of the class described, a supporting frame, a seed planting element including a frame and a ground wheel supporting yoke hingedly connected therewith, means for connecting the yoke slidably with the supporting frame, a seed duct and runner connected with the frame of the seed planting element, a shaft also supported by said frame, arms pivoted on said shaft, gage wheels carried by the arms, and means for adjusting the arms to regulate the position of the gage wheels.

3. In a machine of the class described, a supporting frame, a seed planting element including a frame and a ground wheel carrying yoke hingedly connected therewith, a bracket on the yoke slidably engaging the supporting frame, a seed duct and runner connected with the frame of the seed planting element, forwardly converging arms also connected with said frame and with the nose of the runner, a shaft supported by said frame, gage wheel carrying arms pivoted on the shaft, a rock shaft supported on the converging arms and having radial arms, links connecting said arms with the gage wheel carrying arms, and means for manipulating the rock shaft and for securing it at various adjustments.

4. A supporting frame including front and rear cross bars, a seed planting element including a frame and a ground wheel carrying yoke hingedly connected therewith, a bracket member on the yoke slidably engaging the rear cross bar of the supporting frame, a seed duct and runner connected with the frame of the seed planting element, forwardly converging arms extending from said frame and connected with the nose of the runner, and an apertured plate at the junction of said arms with the nose of the runner slidably engaging the front cross bar of the supporting frame.

5. In a machine of the character described, a supporting frame including front and rear cross bars, seed planting elements supported slidably on said front and rear cross bars and each including an operating shaft, said operating shafts having bifurcated interengaging ends slidably connected, and each of said seed planting elements including also a ground wheel supported for rotation, and means including a clutch for transmitting rotary motion from the ground wheel to the operating shaft of one of the seed planting elements.

In testimony whereof I affix my signature in presence of two witnesses.

WILSON E. BIGGERSTAFF.

Witnesses:
P. B. HENDRICKS,
HENRY HAUN.

Copies of this patent may be obtained for five cents each, by addressing the "Commissioner of Patents, Washington, D. C."